Figure 1:
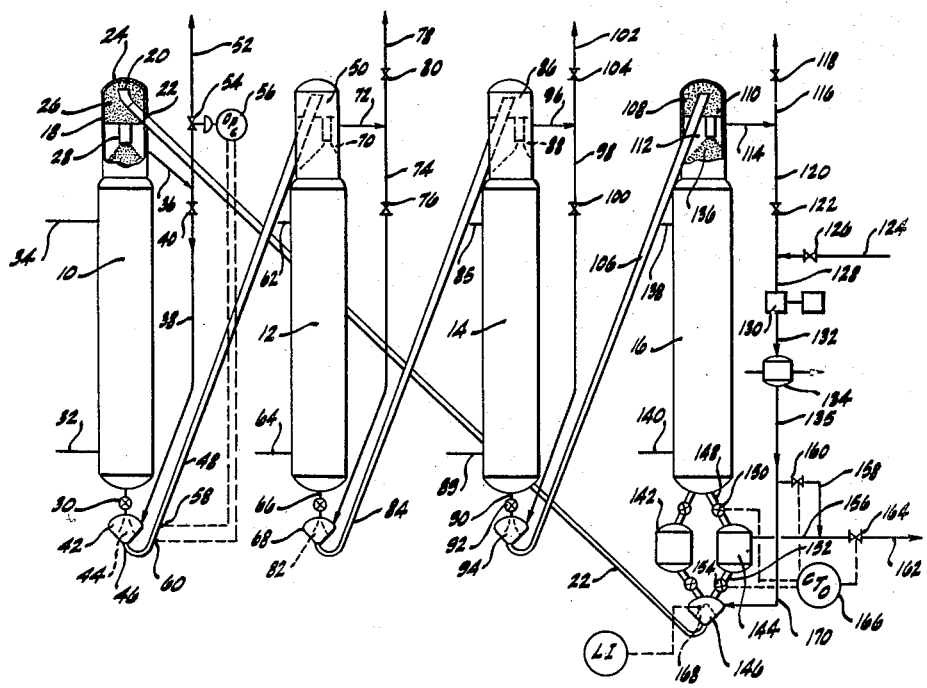

Nov. 24, 1959  W. C. LIEFFERS ET AL  2,914,466
MULTIPLE ZONE FLUID-SOLIDS CONTACT SYSTEM EMPLOYING
A DENSE PHASE PNEUMATIC SOLIDS CONVEYANCE TECHNIQUE
Filed Jan. 20, 1955  2 Sheets-Sheet 1

INVENTORS,
WILLIAM C. LIEFFERS,
FRANK C. RIDDICK, JR.,
ROBERT L. SWITZER,
BY
AGENT.

INVENTORS.
WILLIAM C. LIEFFERS,
FRANK C. RIDDICK, JR.,
ROBERT L. SWITZER,
BY
AGENT.

United States Patent Office

2,914,466
Patented Nov. 24, 1959

2,914,466

MULTIPLE ZONE FLUID-SOLIDS CONTACT SYSTEM EMPLOYING A DENSE PHASE PNEUMATIC SOLIDS CONVEYANCE TECHNIQUE

William C. Lieffers, Santa Ana, and Frank C. Riddick, Jr., and Robert L. Switzer, Long Beach, Calif., assignors to Union Oil Company of California, Los Angeles, Calif., a corporation of California Application January 20, 1955, Serial No. 483,123

11 Claims. (Cl. 208—165)

This invention relates to an improved process and apparatus for handling granular solids and in particular relates to the handling of granular solid materials in an improved-solids fluid contact system. Although there are many different kinds of solid fluid contact which are presently effected on a large scale commercial basis in modern industrial operations, the noncatalytic and catalytic hydrocarbon conversion operations in which the hydrocarbon is brought into contact at conversion conditions of temperature, pressure, and composition for a variable reaction time in the presence of catalytic or noncatalytic solid granular contact material are probably typical of most such fluid contact processes. Most of these processes are carried out in the presence of solid contact material which is circulated by any suitable means through a series of contact zones including one or more reaction zones and at least one solid contact material regeneration zone.

In such solids-fluid contacting processes the solid contact material is circulated in a closed cyclic path which includes a series of alternate contacting columns and solid conveyors. The fluid or fluids to be contacted are passed at conversion or reaction conditions through one or more of the contacting vessels to achieve the desired degree of fluid reaction or solid treatment and the effluent product fluid is disengaged from the solids and subjected to further processing or storage. In nearly all such circulated solids processes a spent or deactivated stream of solid contact material is produced, such as the spent hydrocarbonaceous catalyst in hydrocarbon conversion processes. This material is reactivated or regenerated by a further solid-fluid contact in a regeneration column under suitable processing conditions. The regenerated solids continue in the closed cyclic path and are passed back to contact further quantities of the other fluids.

In hydrocarbon conversion processes for example, such as the well known catalytic and noncatalytic processes for hydrocarbon cracking, hydrocracking, coking, desulfurization, denitrogenation, isomerization, polymerization, aromatization, reforming, hydrogenation, dehydrogenation, and others, a solid contact material which is usually but not necessarily a granular catalyst is circulated through a series of solid-fluid contacting zones, including a hydrocarbon conversion zone, a catalyst stripping zone, a catalyst regeneration zone, a catalyst elutriation zone for solids fines removal, and possibly a catalyst pretreatment zone. The foregoing zones are sometimes consolidated in a single contacting column, but in many instances two or more contacting columns are employed standing adjacent each other. In such cases some means necessarily must be employed for granular solids conveyance from one processing step or column to the next.

In the past the granular solids have been conveyed in some processes by means of bucket elevators, but these have been found to be disadvantageous in that the solids conveyance capacity is too low for the physical size of the equipment required, the loading and unloading of the buckets cause excessively high attrition of the granular solids, and because the moving mechanical parts operate at elevated temperatures the lubrication and other maintenance is exceedingly difficult.

Pneumatic or gas lift conveyors have been employed in some of the processes, but these are subject to serious difficulties in that an excessively large volume of conveyance fluid moving at high velocity is required, the granular solids being conveyed impact against each other and against the internal walls of the equipment as they are carried in suspension causing serious solids attrition and equipment erosion, etc.

A very recent and probably the only fundamental modern advance in solids conveyance involves the conveyance or recirculation of granular solids under the influence of a pressure gradient maintained in a conveyance conduit by means of a concurrent conveyance fluid flow at very low velocity and low volumetric rate in which the granular solids move as a continuous dense mass of granular solids having a bulk density substantially equal to that of the granular solids when at rest. There are no moving mechanical parts, the solids move at low velocity under conditions which totally prevent solids to surface impact, and the solids loss due to attrition and equipment erosion have been reduced substantially to zero. Because the granular solids are not dispersed or suspended in the conveyance fluid phase, but are conveyed as a dense mass in plug type flow, extremely high volume or weight rates of solids conveyance are permitted in relatively small sized equipment. For example, synthetic bead cracking catalyst is easily conveyed at rates up to about 38,000 pounds per hour in a conveyance conduit having a minimum inside diameter of 3 inches, and catalyst circulation rates of 600 tons per hour at 950° F. are readily effected in a conveyance conduit having a minimum inside diameter of 14 inches. These remarkably high rates are achieved with the substantial absence of the other problems briefly mentioned above.

In the conveyances of the prior art separate conveyance fluids are ordinarily employed and a separate supply of seal fluid such as steam is required to prevent intermixing of the conveyance fluid with the fluids to be contacted. When one or more of the contacting zones in the system is desirably operated at a pressure different from the others, only minor pressure differences were permissible such as about 15 pounds per square inch and this required the use of lengthy sealing legs of the order of 75 feet in height to sustain the pressure differential. This was exceedingly disadvantageous because the mechanical structure necessary to support the solids-fluid contacting equipment frequently exceeded 200 feet and in some instances have approached 300 feet in height.

In addition to the solids transportation problems of the previous processes, the control of the solids recirculation rate and of the indication and control of solids levels or solids inventory in the recirculating system have been exceedingly difficult. One particular phase of this problem involves the control of the rate of removal of granular solids from a given contacting column in which it has been difficult to maintain a uniform solids withdrawal pattern throughout the cross section of the column. A further problem which has only heretofore been partly solved involves the uniform contacting of the fluid with the granular solid contact material. The problem is relatively simple when gaseous fluids are being contacted, but with liquid feeds the problem is exceedingly difficult and no known solution to this problem has yet been devised in which each granular solid particle is contacted with a proportionate part of the total liquid feed. A still further problem which is characteristic of all recirculating solid-fluid contacting processes involves the efficient removal of solids fines from the circulated solids stream. There is invariably a small amount of solids fines present in the recirculated solids stream due inherently to the fact that the granular solids move. Although the dense phase conveyance of these solids eliminates better than 99% of the attrition and erosion which produces these fines, prolonged operation will invariably give rise to the presence of this fine material. The continuous separation of solids fines from a recirculating stream of solids has in the past been accomplished by elutriation of the solids by a fluid flowing at controlled velocity, but invariably some fine solids remained and some solids having average dimensions greater than those desirably removed were also removed with the fiines.

The present invention therefore is directed to an improved solids-fluid contacting process of general application wherein substantially all of these problems are successfully avoided. Particularly this invention is directed to an improvement in those catalytic or noncatalytic hydrocarbon contact processes in which a liquid or only partially vaporized hydrocarbon is brought into contact with a recirculating stream of solid granular contact material. The present invention is also directed to the specific solids handling technique herein described by means of which the novel and unexpected results have been obtained.

It is therefore a primary object of this invention to provide an improved circulation system for granular solid contact material in a solid-fluid contact process.

It is a more particular object to provide an improved solids circulation system for solids which are recirculated through a series of two or more vessels which may be contact columns in alternation with two or more conveyance steps.

It is a specific object of this invention to provide a solids fluid contact process wherein the solids are recirculated through a series of alternate contact columns, operated at substantially different pressures, and conveyance zones by employing a single stream of conveyance fluid depressuring in steps in succession through each of the conveyance zones while by-passing each of the contacting zones.

A more specific object of this invention is to provide such an improved solids conveyance system in a hydrocarbon conversion process using a recirculating stream of solid contact material such as a hydrocarbon conversion catalyst.

It is a further object of this invention to provide an improved apparatus for accomplishing the aforementioned objects.

Other objects and advantages of the present invention will become apparent to those skilled in the art as the description and illustration thereof proceeds.

Briefly the present invention comprises an improved solids-fluid contacting system in which a stream of solid contact material is recirculated through a series of alternate contacting zones and solids conveyance zones in a closed cyclic path. The contacting zones are operated at substantially different pressures and a single conveyance fluid flows concurrently with the granular solids in series through the conveyance zones only. The fluid is by-passed around each contacting column by disengaging the fluid from the solids at the point of solids introduction into the column and re-engaging at least part of the fluid with the solids at the point in the same column at which the solids are removed for conveyance to the subsequent column in the series. The number of columns in the series may be a minimum of two, or there may be three, or four, or more columns depending upon the number of individual solids-fluid contacts required in the particular process.

The granular solids are conveyed in the form of an elongated continuous mass of compact or dense solids having a bulk density substantially equal to the static bulk density of the solids when at rest. This bulk density is substantially the same as that of a downwardly moving compact bed of the solids passed by gravity through a contacting or other vessel. This type of solids conveyance through an elongated conduit or conveyance zone is effected by maintaining a dense accumulation of solids to be conveyed submerging the inlet opening of the conveyance zone. This is accomplished by supplying solids to the accumulation at substantially the same average rate as the rate that the solids are conveyed through the conveyance zone. The granular solids are maintained during conveyance in the dense compact form briefly described by applying a solids flow restriction against the stream of compact solids discharging at the outlet of the conveyance zone. This is effected by discharging the solids in any direction from the conveyance zone outlet against a transverse surface, such as a separate thrust plate or the wall or the roof of a solids receiving chamber, which surface is disposed adjacent the outlet opening of the conveyance zone at a distance between about 0.1 and about 2.0 conveyance zone outlet diameters away from the outlet. The mass of granular solids discharged from the outlet then flows downwardly by gravity surrounding the outlet and extending downwardly to a contacting column in which the granular solids are employed. The solids flow restriction at the outlet may be also accomplished by discharging the dense mass of solids from the outlet in substantially any direction into a solids receiving chamber in which a mass of discharged solids is maintained which submerges the outlet opening of the conveyance conduit. The discharge direction may be upwardly into such a bed of solids, or horizontally, or downwardly, and in which latter case the submerging bed of solids takes the form of a conical pile whose apex extends upwardly and into the outlet opening. In any event, the flow of conveyed solids in the form of a dense compact mass is restricted at the outlet opening which prevents the granular solids from being dispersed and maintains them at the outlet and throughout the conveyance zone as an elongated dense moving mass.

This dense mass of granular solids is caused to move by passing a concurrent flow of a conveyance fluid through the conveyance zone in the desired solids flow direction. This fluid is introduced at the conveyance zone inlet at a high pressure relative to the pressure maintained at the conveyance zone outlet where the conveyance fluid is disengaged from the discharged dense mass of conveyed solids. This over-all pressure differential generates and maintains the concurrent flow which passes through the serially interconnected interstices of the dense solids mass generating therein a pressure gradient having a value defined by the following equation:

$$\frac{dp}{dl} \geq \rho_s \cos \theta \qquad (1)$$

in which $$\frac{dp}{dl}$$

is the pressure gradient at any point in the conveyance zone in pounds per square foot per foot, $\rho_s$ is the static bulk density of the solids when at rest in pounds per cubic foot, and $\theta$ is the angular deviation of the conveyance direction measured from a vertical upward reference axis. The value of $$\frac{dp}{dl}$$

in Equation 1 therefore is a minimum value determined solely by the bulk density of the solids being conveyed and the conveyance direction. When the conveyance fluid flows at a rate sufficient to generate a pressure gradient defined by Equation 1, the forces of gravity acting on the granular solids are neutralized and a slight increase in the pressure gradient effected by increasing the conveyance fluid flow is also sufficient to overcome forces of friction of the inner surfaces of the conveyance zone walls on the solids. This permits the solids to move upwardly as a continuous dense mass so long as solids are supplied to the aforementioned accumulation at the conveyance zone inlet and are removed at substantially the same rate from the mass of discharged solids at the conveyance zone outlet.

From the foregoing considerations and Equation 1 it can be seen that the over-all pressure differential ΔP required to operate this type of conveyance when conveying any specific type of granular solids having a bulk density of $\rho_s$ through a conveyance zone having a length L in feet in a direction of angular deviation $\theta$ from a vertical upward reference axis is given as follows:

$$\Delta P \cong \rho_s \cos \theta L \qquad (2)$$

in which ΔP is the over-all pressure differential in pounds per square feet between the inlet and outlet of the conveyance zone. The actual operating pressure differential will be slightly greater than the value given by Equation 2 because of the frictional forces previously mentioned.

The degree to which the actual pressure gradient $$\frac{dp}{dl}$$

and the over-all pressure ΔP must exceed the minimum values defined respectively by Equations 1 and 2 depends to some extent upon the nature of the granular solids and the nature of the internal surface of the conveyance zone. Actual experience with the type of granular solids conveyance indicates that the minimum operating values of pressure gradient and over-all pressure differential usually are of the order of 10–50% in excess of the minimum values defined by Equations 1 and 2. It should be understood however that pressure gradients and over-all pressure differentials greatly in excess of these minimum values may be generated and maintained in this type of conveyance zone when necessary or desirable and they have no noticeable effect upon the density of the granular solids being conveyed or the rate of solids conveyance. The density of the granular solids being conveyed is substantially constant, subject to slight changes due to rearrangement in granular solid packing geometry, and thus is independent of the actual operating pressure gradient or over-all pressure differential and independent of the granular solids conveyance rate. The conveyance rate is solely determined by the rate at which the granular solids are removed from the outlet of the conveyance zone and, of course, to maintain the dense moving mass of granular solids, granular solids to be conveyed must be conveyed to the accumulation of solids at the inlet at this same rate.

Each solids-fluid contacting column in the series of columns and conveyance zones according to this invention, except the first or highest pressure column, operates at an average pressure which is less than the operating pressure of the previous column from which the granular solids were conveyed by an over-all pressure differential which is substantially equal to the operating over-all pressure differential ΔP of the conveyance zone which transports granular solids into that contacting column. This pressure differential, as stated before, may be a minimum value slightly in excess of that defined by Equation 2, or it may be any greater value. Such higher operating values are desirable in instances as where spent granular contact material is conveyed from a high pressure reaction zone into a solids stripping and/or regeneration zone preferably operating at a substantially lower pressure.

The solids in this system are alternately conveyed between and passed through contacting columns of successively lower pressure until they are removed after passage through the last or lowest pressure column for return to the first column. The solids are withdrawn from the low pressure column and are introduced into a solids pressuring zone or zones. Herein the pressure of the fluid present in the interstices of the solids is increased to a value somewhat in excess of that of the contacting column operating at the highest pressure. The pressure increment within the solids pressuring zone is also substantially equal to the total of the pressure differentials existing between the inlet and the outlet of all of the conveyance zones. The solids pressuring zone may take any of a variety of mechanical forms, but in essence comprises a sealable pressure vessel into which the solids to be pressured are introduced, the pressure is then raised by the introduction of high pressure fluids, the pressured solids are withdrawn for reconveyance, and the vessel is then depressured prior to the introduction of additional low pressure solids. The thus pressured solids are then passed from the pressuring zone or zones into a solids accumulation at the inlet of a conveyance zone, and reconveyed concurrently with a conveyance fluid flow for reintroduction into the highest pressure contacting column.

In the process of the present invention the pressure differentials existing between various points within an individual contacting column are ordinarily relatively insignificant compared to the over-all pressure differential existing between individual columns, that is, they are insignificant relative to the over-all pressure differential existing between the inlet and the outlet end of a given conveyance zone. The pressure of fluids associated with solids conveyed into a given contacting column is substantially the same insofar as the present invention is concerned as the pressure of fluids associated with these solids when they are removed from that same contacting column for conveyance to a subsequent column.

In accordance with the present invention therefore the cyclic process contemplates the utilization of a single stream of conveyance fluid passing serially through the conveyance zones, decreasing in pressure as it flows through each successive conveyance zone. A complete closed cyclic path for the conveyance fluid is thus realized through the steps of disengaging the conveyance fluid from the solids at the solids inlet point for a given contacting column, by-passing the thus disengaged fluid from the solids inlet point to the solids outlet point for that contacting column at substantially the same pressure, reengaging the conveyance fluid with the solids removed at the solids outlet point, and concurrently conveying the solids and the conveyance fluid through a conveyance zone to the solids inlet point of the subsequent lower pressure contacting column. These same steps are carried out at each of the contacting columns except the last or lowest pressure column. In this case the disengaged conveyance fluid must be repressured by an amount equal to the total pressure differential of all the conveyance zones and then it is re-engaged with the pressured solids described above for recirculation.

Thus in the present invention the granular solids move in a closed cyclic path through a series of alternate contacting zones and solids conveyance zones, and the conveyance fluid moves also in a closed cyclic path through a series of alternate fluid by-pass zones separate from the solids, and through solids conveyance zones concurrently with the solids. The by-pass zones serve to conduct the fluid alone from the solids inlet to the solids outlet of a given contacting column at low pressure drop while the granular solids are passing between those same two points through the contacting column.

Of course, if desired, the conveyance fluid may be used on a "once through basis" if a source of high pressure fluid is available. In such case it is introduced into contact with the pressured solids after removal from the lowest pressure column and passage through the pressuring zone and is then passed successively through the conveyance and by-pass zones to the point of solids introduction into the lowest pressure contacting zone. At this point the fluid may be disengaged from the solids and instead of recompressing it for recycle, it may be discarded.

In order to compensate in the by-pass lines for any slight pressure differentials between the solids inlet and the solids outlet point in a given contacting column, a slight fluid flow restriction such as a valve or an orifice to decrease the pressure or a small blower to increase the pressure may be connected in the by-pass line as necessary to equalize the pressures. The design and operation of the contacting zone itself is easily modified in many cases to equalize these pressures. In other cases where a small pressure drop through the by-pass line is needed, the resistance to fluid flow in the line itself may be sufficient.

In the conveyance zones of the present invention as indicated above, the pressure gradient and the over-all pressure differential are quite substantial and accordingly the depressuring of the conveyance fluid during passage therethrough causes a corresponding increase in the specific volume of the fluid depending upon its compressibility characteristics. Such increases in the specific volume cause corresponding increases in fluid velocity and these in turn, unless compensation for them is made, will result in a successively increasing pressure gradient at points along the length of conveyance zone having a constant cross sectional area. This pressure gradient increase is desirable when over-all pressure differentials greater than the minimum pressure differential as defined by Equation 2 are employed. In the case however when such excessively high pressure differentials are unnecessary, the increasing pressure gradient is disadvantageous because it is wasteful of conveyance fluid energy.

Accordingly the present invention contemplates the use of conveyance zones whose cross sectional areas increase in the direction of solids conveyance at a rate sufficient to compensate for the specific volume increase so that a substantially constant pressure gradient exists at all points along the length of the conveyance zone. This means that the outlet area of the conveyance zone is larger than the inlet area. Therefore, when the conveyance fluid is disengaged from the solids delivered at the solids inlet of a given contacting column and by-passed for re-engagement with the solids removed from that same column for introduction into the subsequent conveyance zone, the quantity of fluid is sufficient to generate pressure gradients in the conveyance zone inlet which are considerably greater than the minimum required because the cross-sectional area near the conveyance zone inlet is smaller than the cross-sectional area in the preceding conveyance zone outlet and accordingly the fluid velocities are higher. The present invention contemplates removing a sufficient portion of the disengaged conveyance fluid at the solids inlet of a given contacting column and either discarding it or passing it directly to an appropriate interstage inlet on a multi-stage compressor employed to repressure the lower pressure conveyance fluid as described. The amount so separated is controlled so as to leave a portion for re-engagement with the solids which is sufficient to generate at least a minimum pressure gradient defined by Equation 1 in the decreased area open to fluid and solids flow at the next conveyance zone inlet. This control may be made automatic by means of a differential pressure controller which detects the pressure gradient existing in the next subsequent conveyance zone and feeds in only an appropriate proportion of conveyance fluid so as to maintain the pressure gradient near the minimum operating value, and discards the rest.

The degree of change of the cross-sectional area in each conveyance zone and accordingly the degree to which conveyance fluid is bled from the system at each fluid disengaging point is dependent upon the degree to which the fluid expands in volume on pressure reduction. Substantially no expansion effects are noted when the conveyance fluid is a liquid. The same effect is also noted when the conveyance fluid is a gas or vapor and the over-all pressure differential between the inlet and the outlet of the conveyance zone is less than about 5% of the average fluid pressure in that conveyance zone. However with the gaseous conveyance fluids flowing in conveyance zones whose over-all differential pressure exceeds about 5% of the average absolute pressure the expansion effects and velocity and pressure gradient increases are not insignificant. The conveyance zones operating under such conditions are preferably tapered or otherwise provided with an increasing cross-sectional area. The same pressure gradient control can be obtained by removing controlled portions of the conveyance fluid at one or more points along the conveyance zone.

Preferably the conveyance fluid is an inert material such as steam, carbon dioxide, nitrogen, or any of the other gases inert under the conditions existing in the conveyance and solids-fluid contacting systems. Frequently a cheap inert gas comprises flue gas which is oxygen free. In this way a small proportion of the conveyance fluid may be bled from the conveyance fluid cycle as a seal gas directly into the contacting zone so as to pass concurrently with the solids at the solids inlet point and counter-current to the solids at the solids outlet point of each contacting column thereby preventing the particular fluids present in one contacting column from flowing through the communicating conveyance zones into the adjacent contacting zones.

Figure 2:
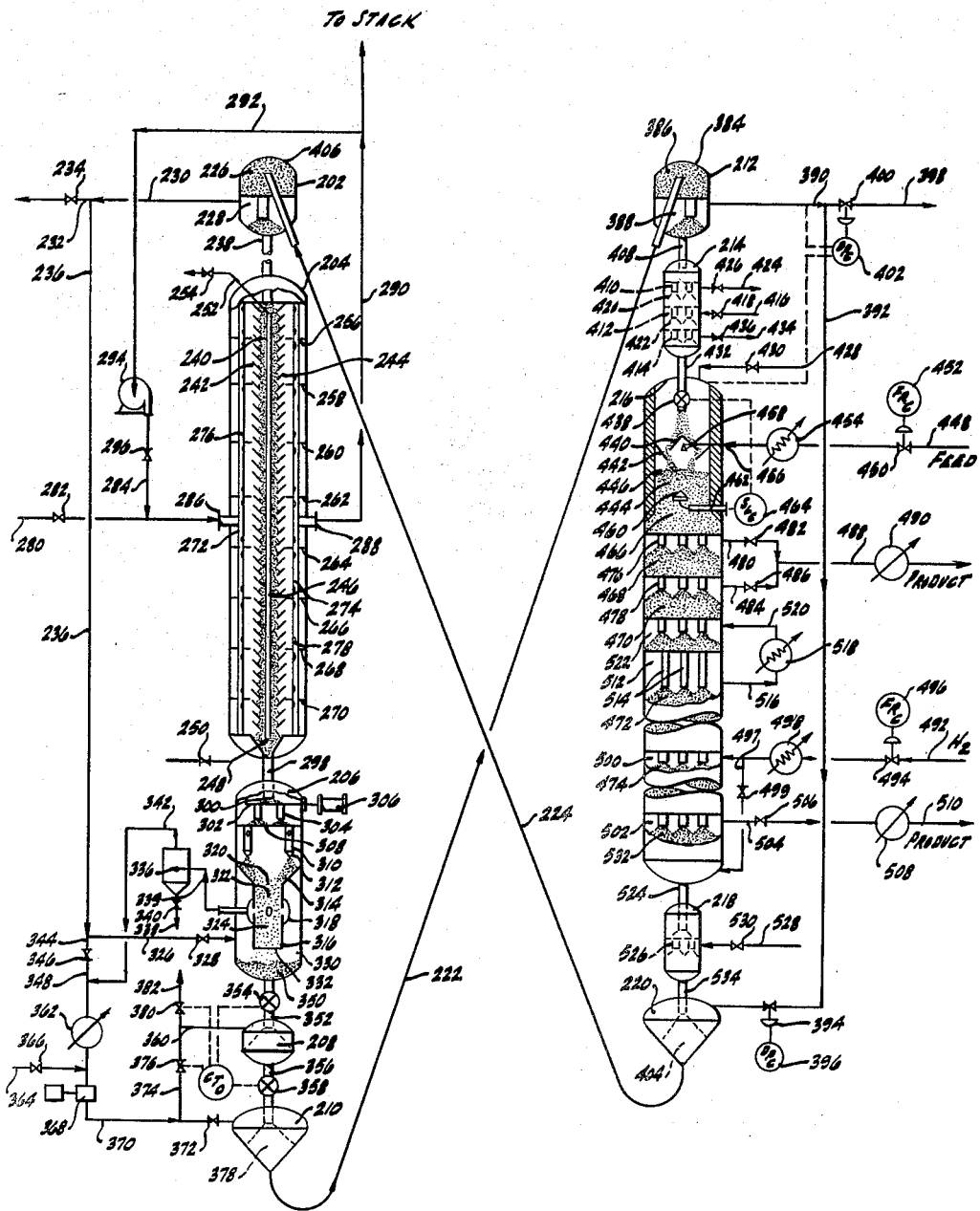

The present invention may be more readily understood by reference to the accompanying drawings illustrating several embodiments thereof and in which:

Figure 1 is a schematic flow sheet of a general application of the present invention to a solids-fluid contacting process employing a plurality of four individual contacting columns, and Figure 2 is a schematic view in partial cross section of a specific modification of this invention as applied to an improved process for the high level conversion of liquid hydrocarbon in the presence of a recirculating stream of granular solid cracking catalyst.

Referring now more particularly to Figure 1 the process of the present invention is shown applied to the circulation of a continuous stream of granular solid contact material through a series of four contacting columns 10, 12, 14, and 16 in which the granular solids are contacted at successively lower pressures with several fluid streams. High pressure solids are introduced at 500 p.s.i.g. into separator zone 18 from the outlet 20 of fourth conveyance zone 22. The granular solids therein are maintained as a dense moving mass by discharging the solids from opening 20 upwardly against roof 24 of separator 18. The discharged granular solids pass downwardly as moving bed 26 through conveyance fluid disengaging zone 28 and then continue on downwardly by gravity as a moving bed through first contacting column 10. The solids herein are maintained in bed form and move at a rate controlled by valve 30 while a fluid is passed into direct contact with the solids by means of inlet and outlet 32 and 34 at about 500 p.s.i.g. The partially depressured conveyance fluid at about the same pressure is removed from disengaging zone 28 through line 36. A first and at least a major portion thereof passes through first by-pass line 38 controlled by valve 40 and is re-engaged with the solids withdrawn from first contacting column 10 by introduction of the fluid into first induction zone 42. Herein a solids accumulation 44 submerges inlet opening 46 of first conveyance zone 48. The granular solids and the major portion of the conveyance fluid pass concurrently therethrough into first conveyance zone 48.

As described above, the quantity of gaseous fluid necessary to convey granular solids at outlet opening 20 for the conveyance zone 22 is somewhat more than that required to convey the same granular solids through the smaller cross-sectional area at the inlet of first conveyance zone 48. Accordingly, a controllable minor portion of the conveyance fluid disengaged from the solids in zone 28 and removed therefrom through line 36 is withdrawn from the by-pass line through line 52 at a rate controlled by valve 54. This valve may be automatically operated by differential pressure controller 56 which in turn is actuated by the pressure differential existing between points 58 and 60 near the inlet of first conveyance zone 48. Differential pressure controller 56 is adjusted to maintain a pressure gradient sufficiently greater than the minimum value defined by equation 1 above and adapted to actuate valve 54 so as to vent a greater portion of the conveyance fluid when pressure differentials higher than that desired are detected by the differential pressure controller.

In first conveyance zone 48 the granular solids and the conveyance fluid depressure concurrently through first conveyance zone 48 whose cross-sectional area increases in the flow direction to maintain an approximately constant pressure gradient. The solids are discharged together into separator 50 at about 450 p.s.i.g. and flow downwardly by gravity as in the previous column for passage through second contacting column 12 in contact with a fluid at about the same pressure passed therethrough via suitable inlets and outlets such as 62 and 64. The granular solids are withdrawn through valved line 66 and passed by gravity into second induction zone 68. The conveyance fluid is disengaged from the solids in second disengaging zone 70 and passes through line 72 and by-pass line 74 provided with valve 76 and is introduced into induction zone 68. Because of the conveyance gas expansion a second minor portion is removed from by-pass line 74 by means of line 78 controlled by valve 80, which if desired, may be actuated by a pressure controller analogous to differential pressure controller 56 described previously.

The same steps are repeated as previously described, the solids from accumulation 82 and the conveyance fluid pass concurrently and depressure through second conveyance zone 84 and are discharged together into separator 86 at a pressure of about 400 p.s.i.g. The conveyance fluid is disengaged in disengaging zone 88 and the solids pass downwardly through contacting column 14. A contact fluid is passed therethrough via inlet and outlet 85 and 89. The solids flow through line 90 provided with valve 92 and pass into third induction zone 94. As before, the disengaged conveyance fluid is removed through line 96, the major portion flows through by-pass line 98 provided with valve 100 into third induction zone 94 at about 400 p.s.i.g. and the third minor portion is removed from by-pass line 98 through vent line 102 controlled by valve 104 so that the pressure gradient at the inlet end of third conveyance zone 106 is not excessively high where pressure gradients above the minimum values are not desired.

The granular solids and the remainder of the conveyance fluid are discharged into fourth separator 108 at 350 p.s.i.g. and flow downwardly together as moving bed 110 into fluid disengaging zone 112. The depressured conveyance fluid is removed therefrom through line 114. In the event that a "once through" conveyance fluid flow is employed, this depressured conveyance fluid is vented entirely through line 116 controlled by valve 118. In other types of operation a minor portion of the conveyance fluid may be so removed. When a closed conveyance fluid cycle is employed, the disengaged conveyance fluid passes through line 120 controlled by valve 122, is mixed with any additional conveyance fluid if desired, and introduced through line 124 controlled by valve 126. The fluid flowing through line 124 may conveniently be collected from lines 52, 78, and 102. The mixture thus formed is passed through line 128 and is compressed to a pressure of about 550 p.s.i.g. by compressor 130. The pressure increase from 350 to 550 p.s.i.g. is substantially equal to the total pressure differentials of 50 p.s.i.g. in each of the four conveyance zones 22, 48, 84, and 106 described above. The compressed fluid flows through line 132 into an optional cooler and cleaner 134 from which it is removed and employed as described below.

The conveyed granular solids pass downwardly as moving bed 136 through fourth contacting column 16 and are contacted at about 350 p.s.i.g. with a fluid passing therethrough by means of inlet and outlet 138 and 140. Provided immediately below fourth contacting column 16, which is the lowest pressure column in the series, are solids pressuring zones 142 and 144. The operation of each of zones 142 and 144 is identical and the individual steps are staggered so that a substantially continuous removal of solids from contacting column 16 and a substantially continuous introduction of pressured solids into fourth induction zone 146 are maintained.

The operative steps of solids pressuring will be described in connection with zone 144 only, it being understood that the operation of zone 142 and any additional pressuring zones are identical. Pressuring zone 144 communicates in solids receiving relation with the bottom of contacting column 16 through transfer line 148 provided with valve 150 and it communicates in solids delivery relation with fourth induction zone 146 through transfer line 152 controlled by valve 154. Pressuring zone 144 is further provided with manifold conduit 156 which communicates through pressure conduit 158 controlled by valve 160 and through vent line 162 controlled by valve 164.

Under the influence of cycle timer operator instrument 166, valves 150, 154, 160, and 164 are opened and closed in sequence so that solids are introduced into pressuring vessel 144 through line 148 when vessel 144 is at 350 p.s.i.g. Valve 150 is then closed and valve 160 is opened to introduce 550 p.s.i.g. or higher pressure conveyance fluid thereinto via line 156 raising the pressure to substantially the 550 p.s.i.g. value. Valve 160 is then closed, valve 154 is then opened and the pressured solids discharged by gravity through line 152 to supplement the solids accumulation 168 in fourth induction zone 146 for conveyance. Valve 154 is then closed, valve 164 then opens venting pressuring zone 144 from 550 p.s.i.g. to 350 p.s.i.g. At this time valve 150 is then reopened to admit additional low pressure solids and the steps are repeated in sequence. The operation of the other pressure zone 142 shown in Figure 1, and of any additional pressuring zones which may be employed if desired, is identical to that described except equivalent operations are conducted at different times so as to achieve continuity of solids transfer.

The accumulation of pressured solids 168 is thus maintained submerging the lower inlet opening of first conveyance zone 22. The 550 p.s.i.g. conveyance fluid flows through line 170 and the pressured solids and the high pressure conveyance fluid depressure concurrently through conveyance zone 22 into first separator 18 into which they are delivered at a pressure of 500 p.s.i.g. to complete the solids cycle.

It is thus seen that a single cycle of granular solids and a corresponding single cycle of conveyance fluid are thus achieved in which the solids and the fluid depressure in four steps of approximately 50 p.s.i.g. each in the present example. It should be understood that greater or fewer contacting columns may be employed following the principles of this invention as thus illustrated, and that the pressures and pressure differentials given are illustrative only.

The solids being contacted with fluids in each of columns 10, 12, 14, and 16, or any of them, may be maintained in fluidized form by any of the methods known in the art. The solids during conveyance however must be maintained in dense compact form in order to generate the high pressure differentials between the adjacent contacting zones.

The valves indicated in Figure 1 in the solids outlet lines of each contacting column may be left wide open, or may be omitted if desired. In either of these cases, the solids flow rate downwardly through each column is equal to and limited by the rate that the solids are picked up and conveyed in dense phase form through the subsequent conveyance zone. This conveyance rate is controlled by the rate of solids removal at the conveyance zone outlet in the next lower pressure column and it in turn is governed by the rate of removal of solids from the lower outlet of that column when the solids therein are moving as a dense bed. Thus when the series of columns according to this invention operates with moving beds of solids, the entire solids circulation rate is controlled by the rate of solids removal from the lowest pressure contacting column, that is, by the setting of cycle timer operator instrument controlling the rate of solids pressuring zone operation. Furthermore, the solid contact material present in the system exists as a single, uninterrupted, fluid-permeable dense mass of solids extending throughout the entire closed cyclic solids path, except in the solids pressuring and induction zones receiving pressured solids at the highest pressure in the system. In the induction zone is the only solids level having a variable position and its average position therefore gives an accurate indication of the solids inventory. As shown in Figure 1, this level is indicated by a solids level indicator LI which indicates the position of the solids level of accumulation 168 in fourth induction zone 146, so that additional solids may be added when low levels are present.

Referring now more particularly to Figure 2, a schematic flow diagram of the present invention is shown in which granular solids are recirculated through two contacting columns and in which the structural details of the individual apparatus structures are shown. Figure 2 will be described in terms of a specific solids-fluid contacting process, namely the treatment of a hydrocarbon feed stock, at least partially in the liquid phase, boiling above about 400° F. with a catalytic cracking catalyst in the presence of hydrogen to produce a cracked and coked hydrocarbon product consisting substantially entirely of gasoline and lighter hydrocarbons.

The apparatus of the present invention includes first solids fluid separator 202, catalyst regeneration vessel 204, regenerated solids feeder and elutriation vessel 206, solids pressuring vessel 208, and first induction vessel 210. The foregoing elements comprise a series of superimposed vessels constituting one of the columns of the present invention. The second column comprises second solids fluid separator vessel 212, upper sealing vessel 214, reaction vessel 216, lower sealing vessel 218, and second induction vessel 220. The bottom of the first contacting column is connected to the top of the second contacting column by means of first conveyance conduit 222. Second conveyance conduit 224 communicates the bottom of the second contacting column with the top of the first contacting column to complete the closed cyclic solids path.

In the present example the solid granular contact material comprises a silica alumina synthetic bead cracking catalyst containing between 0.1% and 0.2% of chromium oxide by weight to facilitate spent catalyst regeneration. The circulation rate in the present example is 800 pounds per hour. The feed rate is 8.6 barrels per day of a gas oil fraction including 5.7 barrels per day of recycle oil boiling above 400° F. and 2.9 barrels per day of fresh gas oil feed having the following properties:

TABLE 1

*Properties of fresh feed stock*

Boiling range, ° F. _____ 550–760° (90% pt.).
Gravity, ° API _____ 23.5.
Sulfur weight percent_____ 1.15.
Characterization factor _____ 11.5.

The catalyst to reactor charge oil ratio on a weight basis is 6.5 to 1.

The spent catalyst, containing about 0.50% by weight of a hydrocarbonaceous deactivating deposit generally referred to as coke, is discharged as a compact moving bed from second conveyance zone 224 into first solids separator 202. The spent solids bed 226 passes downwardly by gravity through fluid disengaging zone 228 from which the totally depressed conveyance fluid is removed at a pressure of 350 p.s.i.g. through line 230. A portion thereof may be removed if desired through line 232 controlled by valve 234. The remaining portion of conveyance fluid, which comprises an inert flue gas, is recirculated in the conveyance fluid recycle stream through line 236.

The spent granular solids pass downwardly through transfer line 238 for introduction into the upper part of catalyst regenerator 204. The spent catalyst passes downwardly therethrough as moving bed 240 confined between louvered walls 242 and 244, the louvers sloping downwardly and inwardly, confining the catalyst therebetween and providing a low resistance transverse flow path for the regeneration fluid. Extending longitudinally through the downwardly moving bed of spent catalyst is heat exchange zone 246 through which a fluid heat transfer medium is passed at a rate sufficient to maintain the maximum temperature of regeneration at values well below those at which the catalyst is thermally damaged. The heat transfer medium may be gaseous or liquid, and if gaseous it may be passed either concurrently with or countercurrently to the downwardly moving solids bed. If liquid, it is preferred that it be introduced in line 248 controlled by valve 250 for upward passage through heat transfer zone 246 and removal through line 252 controlled by valve 254. In the present example the cooling medium was low pressure steam passed through the regeneration zone so that the maximum temperature was successfully maintained at about 1150° F.

The spaces on either side of the downwardly moving bed 240 of spent cracking catalyst comprise an inlet and outlet manifold zone for the regeneration fluid. This space is subdivided into a plurality of superimposed inlet and outlet manifold zones by means of a series of vertically spaced horizontal baffles 256, 258, 260, 262, 264, 266, 268, and 270. In the present structure, the louvered walls 242 and 244 extend substantially entirely across vessel 204 along lines paralleling the diameter of the column. Extending upwardly through column 204 on each side of the louvered walls are inlet and outlet header zones 272 and 274 respectively adapted to introduce and remove the regeneration fluid from regenerator vessel 204. These header zones in the present example comprise an elongated conduit closed at its ends and provided with one or more apertures 276 and 278 respectively by means of which the fluid passes from inlet header 272 into each of the inlet manifold zones, transversely through the downwardly moving catalyst bed 240, into the corresponding outlet manifold zone, and then into outlet header 274.

Fresh regeneration fluid consisting of air is introduced at a rate of 1000 s.c.f./hr. through line 280 controlled by valve 282 and is mixed with an optional recirculation of spent regeneration gas flowing through line 284. This regeneration gas is introduced through inlet 286 into inlet header 272, is collected in outlet header 274, and removed therefrom through outlet 288 and through line 290 to a stack. If desired a portion of this spent regeneration gas may be recirculated through line 292 by means of blower 294 and line 284 controlled by valve 296 for recirculation with the fresh regeneration fluid into the inlet 286 of the regenerator column 204.

The regenerated catalyst is removed from regenerator 204 at a temperature of about 950° F. containing approximately 0.05% coke by weight. It is conducted downwardly as a moving bed through transfer line 298 and is introduced into the top of regenerated catalyst feeder and elutriation vessel 206.

Vessel 206 is roughly divided into two portions, the upper portion containing especially designed catalyst feeding or metering device comprising a surge volume, and a lower catalyst elutriation device for effecting the continuous separation of a very small quantity of catalyst fines from the recirculating catalyst stream. The catalyst feeding and surge device cooperates actively with the elutriation section and provides for the latter section a continuous metered stream of solids at a constant predetermined volumetric rate from an intermittently flowing source of regenerated solids.

Transfer line 298 extends downwardly into the upper part of vessel 206 and terminates in outlet opening 300. Disposed transversely in the upper part of vessel 206 is reciprocable solids feeder tray 302 with a pair of open ended dependent tubes 304 extending downwardly therefrom. These are the feeder tubes having a known volume and defining the volumetric capacity of the solids feeder. Motive means 306 is provided for reciprocating tray 302 so as to align alternately one or the other of feeder tubes 304 with opening 300 of solids transfer line 298. Disposed immediately below feeder tubes 304 is a lower stationary tray 308 from which depend a plurality of surge tubes 310. These surge tubes are provided at their lower outlet openings with a solids flow restriction 312 which reduces the gravity discharge rate of the tubes to between about 1% and 30% of their normal gravity flow rate. Motive means 306 and reciprocating tray 302 alternately aligns one of the feeder tubes with opening 300 while sealing the lower opening of the same feeder tube against the upper surface of tray 308. At this same time the other feeder tube is aligned with one of the surge tubes thereby discharging its solid contents into the surge tube. Reciprocation of tray 302 intermittently removes incremental volumes of solids from opening 300 and discharges them into surge tubes 310. Because of the outlet restrictions 312, which may be made variable by means of any sort of a variable area orifice structure, a continuous discharge of solids from surge tube 310 is provided at an instantaneous rate which is equal to the average rate at which the feeder tubes charge solids thereto.

The solids discharging from surge tubes 310 pass downwardly and are directed by means of funnel or other appropriate member 314 into the upper portion of an elutriation chamber 316 having an intermediate disengaging means 318 for the removal of suspended solids fines in the elutriation gas. Between disengaging zone 318 and the upper solids inlet 320 is disposed a section of elutriation conduit 316 which is a solids acceleration zone 322 in which the granular solids are allowed to accelerate so that the larger particles attain at least a substantial part of their terminal velocity under the influence of gravity alone and in the absence of any simultaneous flow of fluids. The effect thus achieved has been found to include the substantially complete elimination of larger than desired sized particles in the elutriation gas suspension of fines. This is apparently due to the fact that the solids of undesirable small size reach their terminal velocity very rapidly, whereas the larger sized particles require an appreciable acceleration time. When the unaccelerated solids are dropped into an elutriation zone and a countercurrent flow of elutriation fluid is maintained, that fluid will suspend and remove the fine solids of low velocity as well as larger solids whose velocity is low because the solid has not accelerated to attain a substantial part of its terminal velocity.

In the present invention the solids are allowed to gravitate through acceleration zone 322 to form a shower having a density of the order of 0.5% to 30% by weight of the maximum density in pounds per cubic foot of the dense packed solids when at rest. The substantially fully accelerated solids then pass downwardly into elutriation zone 324 in which they are contacted by a countercurrent flow of elutriation gas introduced through line 326 controlled by valve 328 into elutriation gas engaging zone 330 surrounding elutriation and acceleration conduit 316. This gas passes upwardly through lower outlet 332, decelerating and suspending the finer sized solids, but not the larger solids which move substantially at their terminal velocity. The suspension of solids fines is removed from conduit 316 through disengaging zone 318 and flows through line 334 into separator 336 in which a centrifugal or other appropriate separation of the suspended solids fines is effected. The solids fines are removed through line 338 controlled by valve 340 and the fines free elutriation fluid is removed through line 342.

In the present instance the elutriation conduit 316 was 24 inches long, 2.0 inches in inside diameter, and the disengaging point was located 10 inches from the upper inlet opening of conduit 316. This was sufficient under the conditions of operation to permit the largest sized particles to attain at least 50% of their terminal velocity. Without the acceleration zone 322 the fine solids smaller than 20 mesh were contaminated with as much as 25% of larger sized solids which were not desirably removed. However with the acceleration zone, the fine solids are found to contain less than about 1% of the larger solids desired in the recirculating solids stream.

In the present application of the process of this invention the elutriation fluid comprises spent regeneration gas at 950° F. introduced into the elutriation zone through lines 236 and 326 at a rate of 1000 s.c.f./hour. The remaining spent regeneration gas flows on through line 344 controlled by valve 346 which provides a pressure differential sufficient to force the elutriation fluid through the elutriation zone. The fines free elutriation fluid and the remaining portion of conveyance fluid recycle are joined in line 348 and treated as subsequently described. The elutriated, fines-free catalyst collects as a solids bed 350 in the bottom of feeder and elutriation vessel 206. These solids exist at a pressure of about 350 p.s.i.g. and are to be delivered to reaction column 216 at a pressure of about 400 p.s.i.g.

To accomplish this, one or more solids pressuring vessels 208 are provided in solids receiving relation to solids bed 350 and in solids delivery relation to first induction vessel 210. Transfer line 352 controlled by valve 354 provides a solids inlet to vessel 208 and line 356 controlled by valve 358 provides a solids outlet therefrom into induction vessel 210. With pressure vessel 208 at a pressure of 350 p.s.i.g., valve 354 is opened and a charge of solids passes by gravity through line 352 into vessel 208. Valve 354 is then closed, and a fluid under pressure is admitted through manifold 360 raising the pressure of the fluids in the interstices of the solids in vessel 208 to a pressure of 450 p.s.i.g. In the present modification this fluid comprising compressed flue gas as part of the conveyance fluid recycle. This conveyance fluid is cooled if necessary in cooler 362, is mixed with additional conveyance fluid if necessary flowing through lines 364 controlled by valve 366, is compressed to a pressure of 450 p.s.i.g. in conveyance fluid recycle compressor 368, and is introduced through line 370 controlled by valve 372 into the high pressure point of the conveyance fluid path according to this invention. A part of this high pressure fluid flows through line 374 controlled by valve 376 and through manifold 360 as the high-pressure catalyst pressuring fluid.

With the catalyst pressured to 450 p.s.i.g., valve 376 is closed, valve 358 is opened, and the pressured solids discharge into and are added to solids accumulation 378 in first induction chamber 210. Valve 358 is then closed, valve 380 is opened for a sufficient period to vent pressuring vessel 208 through lines 360 and 382 to a pressure of 350 p.s.i.g. At this time valve 354 is reopened to admit sufficient solids to be pressured and the cycle is repeated at a rate sufficient to pressure the regenerated catalyst at a rate equal to that at which catalyst is withdrawn by means of the reciprocating tray feeder described above.

The 450 p.s.i.g. conveyance fluid and solids are depressured concurrently through first conveyance zone 222 in the form of a dense upward moving bed of compact solids as described above. The solids discharge against the upper surface 384 of second solids-fluid separator chamber 212 and pass downwardly as a moving bed 386 through conveyance fluid disengaging zone 388. The overall pressure differential in conveyance zone 222 is about 50 p.s.i. and accordingly the vonveyance fluid pressure in zone 388 is about 400 p.s.i.g. The major portion of the conveyance fluid is removed through line 390, passed through by-pass line 392 at a rate controlled by valve 394 in accordance with differential pressure controller 396, and is introduced at substantially the same pressure into second induction vessel 220. If desired, a minor portion of the conveyance fluid is removed from line 390 through line 398 at a rate controlled by valve 400 in accordance with differential pressure recorder controller 402 and either discarded or returned through line 364 to conveyance gas compressor 368. The major portion of conveyance fluid engages with accumulation of spent catalyst 404 and they depressure concurrently as an upwardly moving compact mass through second conveyance conduit 224 to a pressure of about 350 p.s.i.g. and are discharged against upper surface 406 of first solids-fluid separator chamber 202 to complete the catalyst and conveyance fluid cycle.

It is apparent from the description thus far that two closed cyclic paths are involved in the process of this invention, one involving the solids and the other involving the conveyance fluid. The two paths coincide in the conveyance zones 222 and 224 and separate in the two principal contacting columns. The solids flow downwardly by gravity through the columns while the conveyance fluid is disengaged from the solids, by-passes from the solids inlet point to the solids outlet point of the column, and is then re-engaged with the solids for the second conveyance step. The by-pass lines are lines 236 and 392.

The hot regenerated catalyst passing downwardly as moving bed 386 flows through transfer line 408 into upper seal vessel 214. Herein a special mechanism and process for isolating the conveyance fluid flow from the hydrocarbon fluids in reaction vessel 216 are employed. Regenerated hydrocarbon cracking catalyst is exceedingly sensitive to the deactivating effects of steam. Steam is desirable as a sealing medium because of its ease of separation from hydrocarbon fluids through cooling and condensing steps and its relative cheapness. In the present invention steam may be employed with substantially no deleterious deactivating effects in upper sealing vessel 214. This vessel is provided with upper disengaging zone 410, steam engaging zone 412, and lower disengaging zone 414. Seal steam is introduced through line 416 controlled by valve 418 into engaging zone 412 wherein it divides into a first portion which passes upwardly countercurrently to the regenerated catalyst through a small catalyst bed 420 into upper disengaging zone 410, and a second portion which passes downwardly concurrently through small catalyst bed 422 into lower disengaging zone 414. The first portion combines with a minor portion of conveyance fluid flowing concurrently with the catalyst through transfer line 408 and is removed via line 424 controlled by valve 426. The second portion of steam joins in lower disengaging zone 414 with a portion of a blanket stream of hydrogen introduced through line 428 at a rate of 500 s.c.f./hour controlled by valve 430 and which flows upwardly countercurrently to the catalyst through transfer line 432. This lower seal stream is removed through line 434 controlled by valve 436.

Zones 410, 412 and 414 are placed as close together as possible, preferably with not more than a few inches of clearance therebetween in which catalyst beds 420 and 422 exist. In this way a very small amount of seal steam serves to prevent intermixing of the conveyance fluid with the hydrogen and yet the catalyst is in contact in vessel 214 with steam for only an exceedingly short period of time. In the present example this time is about 50 seconds and results in no detectable deactivation of the catalyst. The regenerated catalyst, sealed and stripped of conveyance fluid as above described, drops by gravity through transfer line 432 at a rate controlled by valve 438 into the top of reaction vessel 216 for downward passage therethrough in contact with the hydrocarbon to be converted.

Reaction vessel 216 is of special design to provide for a completely uniform contacting of the entering regenerated catalyst with a hydrocarbon feed which is at least partly in the liquid phase whereby the liquid is adsorbed or otherwise collected on the surface and in the pores of the adsorbent cracking catalyst and carried therewith by gravity downwardly through the various individual zones of reaction column 216. The relative catalyst and feed rates are controlled so that no downwardly flowing liquid phase of hydrocarbon exists through the downwardly moving catalyst bed. The catalyst bed is maintained at hydrocarbon conversion conditions of pressure, temperature, and composition to effect a catalytic cracking of the adsorbed liquid hydrocarbon in the presence of a flow of hydrogen to produce hydrocarbons of lower molecular weight and greater volatility and having boiling points of below 400° F. These higher volatility hydrocarbons are evolved into the vapor phase from the catalyst bed at any point where they are formed and are swept rapidly without further substantial reaction from the reaction zones by means of a current of hydrogen. The catalyst flow is continued and the reaction temperature is maintained so that at the bottom of the column the spent catalyst contains only a deposit of coke in which the carbon to hydrogen ratio is very high, of the order of 20 to 1. The residence, time of the catalyst in the reactor, the operating pressure, and the operating temperature are thus controlled so as to convert substantially all of the adsorbed liquid hydrocarbon feed into volatile products boiling below about 400° F. and a relatively minor fraction of the feed consisting of this high molecular weight deactivating deposit on the catalyst.

The sealed, regenerated catalyst passes downwardly concurrently with a blanket stream of hydrogen onto inner or primary conical baffle 440 deflecting the catalyst outwardly and downwardly against the inner surface of outer or secondary truncated conical baffle 442. The catalyst is deflected then downwardly to form the downwardly moving catalyst bed 444 which passes completely through reaction vessel 216. The purpose of the two conical distributing baffles 440 and 442 having the shape and relative disposition shown is to form and maintain a substantially flat upper solids surface 446 in the upper portion of vessel 216 on which the partially preheated feed hydrocarbon, at least partly in the liquid phase, is sprayed.

The gas-oil feed is pumped through line 448 at a rate of 8.6 barrels per day controlled by valve 450 in accordance with flow recorder controller 452. The oil is heated to a temperature of about 400° F. in preheater 454 and is then passed through inlet 456 provided with solid cone spray head 458 which is directed downwardly from a point immediately below upper conical baffle 440. The downwardly directed spray is so disposed that the catalyst deflected from the lower truncated conical baffle 442 passes in various directions through the solid cone spray, and catalyst level 446 is so controlled that the upper exposed area of the catalyst bed is substantially equal to and preferably slightly greater than the cross-sectional area of the solid cone spray at the point where the spray contacts upper catalyst lever 446.

It has been found that the relative disposition of baffles 440 and 442 and solid cone spray head 458 results in the contacting of every single regenerated catalyst particle with a substantially uniform quantity of liquid hydrocarbon feed which in turn results in uniform treatment of the feed hydrocarbon and of the catalyst at all times.

The position of solids level 446, which also indicates the inventory of catalyst in the system, is detected by a submerged solids level indicating element 460 disposed below solids level 446 and actuated by the gravitational and frictional forces of the downwardly moving catalyst bed 444. These forces are determined by the depth of catalyst bed above element 460. Element 460 is connected by means of mechanical linkage 462 to solids level controller 464 which in turn actuates solids inlet valve 438 to maintain the solids level 446 at the desired distance below the feed inlet sprays. The conventional solids level indicators which detect the position of the upper solids level 446 with an element penetrating the solids level cannot be used in the present type of process since exposed metal surfaces tend to accumulate a heavy deposit of coke which soon renders inoperable such detecting elements. The improved submerged element 460 serves to detect changes in solids bed level of up to about 1.25 feet in a column 1.5 feet in diameter using a detector element 3 inches in diameter. This detecting element thus can detect solids level changes about equal to the column diameter with an element whose diameter is one-sixth of that diameter. It does not accumulate the hydrocarbon deposit, and is capable of long continued operation.

The catalyst at a temperature of 1050° F. passes through line 432 as described. An initial vaporization of the more volatile components of the feed takes place at solids level 446 and this vapor, together with any vapor fraction of the feed as introduced, passes downwardly through first reaction zone 460 concurrently with the downwardly moving bed of catalyst containing the liquid fraction of the feed adsorbed thereon. The vapor phase flow is concurrent with the major portion of blanket hydrogen introduced as described through line 428.

The moving bed of cracking catalyst containing the adsorbed liquid phase hydrocarbon passes downwardly through first reaction zone 466 concurrently with the mixture of blanket hydrogen and the vapor phase hydrocarbon. During the downward passage continuing reaction of the liquid phase hydrocarbon causes the evolution of additional volatile hydrocarbons which join the vapor phase. A plurality of subjacent serially connected reaction zones are provided for the continued reaction of the adsorbed phase hydrocarbon. In Figure 2 these additional reaction zones are indicated as second reaction zone 468, third reaction zone 470, fourth reaction zone 472, and fifth reaction zone 474. The first, second, and third reaction zones are separated from one another by first and second effluent disengaging zones 476 and 478 from which the volatile hydrocarbons in the vapor phase and the hydrogen recycle stream are withdrawn through lines 480 controlled by valve 482 and line 484 controlled by valve 486. If desired any greater number of concurrent reaction zones similar to zones 466 and 468 may be employed and in each case provision is made for the disengaging of the hydrocarbon vapor from the solids and for the removal of such material to prevent further reaction. The vapor so removed is passed through line 488 into product cooler 490 in which it is passed into a conventional vapor liquid separator. The liquid is sent to storage or further processing facilities not shown and the vapor phase is fractionated to recover light hydrocarbons leaving a hydrogen rich gas which is recirculated to the reactor as the hydrogen sweep gas and blanket gas introduced thereto.

The principal portion of this hydrogen is introduced as the sweep gas into the lower part of the reactor through line 492 at a rate of 1400 s.c.f./hour controlled by valve 494 in accordance with flow recorder controller 496. The hydrogen is heated to a temperature of 1100° F. in heater 498 and is passed through hydrogen sweep gas engaging zone 500 into contact with the downwardly moving catalyst bed. A first portion of this hydrogen sweep gas passes upwardly countercurrently to the downflowing catalyst in fourth reaction zone 472, while the second portion passes downward concurrently with the catalyst in fifth reaction zone 474. This second portion and the finally evolved hydrocarbon vapors are disengaged from the catalyst in disengaging zone 502 and are removed therefrom through line 504 controlled by valve 506 to be cooled and partially condensed in cooler 508. A third part of this sweep gas is introduced as a spent catalyst purge gas at the bottom of the reactor via line 497 controlled by valve 499. It passes upwardly to outlet line 504. The cooled effluent is passed through line 510 to vapor liquid separating facilities similar to those above described. If desired, all of the effluents removed from lines 480, 484, 504 and any others when used may be combined for simultaneous treatment, or each or any combination thereof may be handled separately.

The first portion of sweep hydrogen passes upwardly countercurrently to the catalyst into interheater disengaging zone 512 which is provided with a plurality of relatively long internal sealing legs 514 of restricted cross-sectional area. A minor portion of this hydrogen passes upwardly through sealing legs 514, generates a pressure differential in flowing therethrough which forces the major portion to flow through line 516 into interheater 518 and then back through line 520 into interheater engaging zone 522. Because of the vaporization and desorption of high volatility hydrocarbon from the downwardly moving catalyst, and because of the endothermic heat of reaction, the temperature of the catalyst bed decreases as it passes downwardly through reaction column 216 from zone to zone. During passage of hydrocarbon and hydrogen through interheater 518, it is heated from about 900° F. to about 1100° F. to supply heat to the catalyst passing downwardly from zone 470. One or more of such interheating zones may be employed in a given column, but in any event their structure and operation are analogous to those described immediately above.

The spent deactivated cracking catalyst containing as high as 12–15% carbon by weight or more is discharged from the bottom of reactor column 216 through outlet line 524 into lower seal vessel 218 provided with steam engaging zone 526. Since the deactivated catalyst is unaffected by steam, the structure of upper seal vessel 214 is not required at this point. A first part of the steam introduced through line 528 at a rate controlled by valve 530, passes upwardly countercurrently to the catalyst, strips residual volatile hydrocarbons in lower stripping zone 532, and is removed with the lower product through line 504. The second part of this stripping steam flows concurrently with the spent catalyst downwardly through line 534 into second induction vessel 220 wherefrom it is conveyed as described before through second conveyance conduit 224 into first solids-fluid disengaging separator 202.

In the event that the reactor is to be operated at a lower pressure than the regenator, the solids pressuring vessel 208 and its associated equipment is disposed below the reactor in line 524 or 534 and operated as above described.

In the experimental verification of the process of this invention using the reaction and regeneration conditions outlined above with the feed stock defined in Table 1 it was found that an 85% by volume conversion of the feed stock to a gasoline product boiling below about 400° F. may be obtained. The physical properties of the product are as follows:

TABLE 2

*Reactor product characteristics*

| | |
|---|---:|
| Gravity, ° API | 50 |
| Boiling range, ° F. | 120–410 |
| Weight percent sulfur | 0.3 |
| Knock ratings— | |
| F–1 clear | 86.0 |
| F–1+3 | 93.0 |

In a modification of the above described hydroconversion process, the synthetic bead cracking catalyst is impregnated with a substantial amount of chromium, such as between about 10% and about 15% by weight. This catalyst, besides having cracking activity, also actively promotes the hydrocracking of the higher molecular weight hydrocarbons.

With a completely liquid feed and a synthetic bead cracking catalyst, the minimum weight ratio of catalyst to oil is about 8.0 under the control conditions previously defined. Usually however feed preheating and/or the presence of vaporizable constituents in the feed permit this ratio to be reduced to as low as about 5.0 and still maintain the liquid hydrocarbon in the conversion zone entirely on the surface and/or in the pores of the solid contact material.

The foregoing description of Figure 2 given in terms of a specific solids-fluid contacting process in which the present invention has been applied should not be construed as a limitation of the process to the specific temperature and pressure conditions, feed stock, or granular solid contact material described. Although the invention is highly efficient in the conversion of gas oil boiling range hydrocarbons to gasoline boiling range hydrocarbons, the invention has general applicability in the treatment of liquid feeds generally with adsorptive contact material to produce an effluent having a lower boiling range. For example heavy gasolines may be converted to light gasolines boiling below about 300° F. for example, or to even lighter solvents, or to the liquefiable hydrocarbons including propane and butane. The present invention is also applicable under lower pressure conditions to the direct treatment of crude or reduced crude to produce kerosene, gas oils, gas oil fractions suitable for producing jet fuels, diesel fuels, and the like, as well as lighter materials such as light gas oil, the heavy and light gasolines, and the propane and butane fractions.

The present invention has been described with reference to hydrocarbon cracking and coking in the presence of hydrogen. By using a modified catalyst or a physical mixture of two catalysts, simultaneous hydrocarbon conversion processes such as desulfurization, reforming, denitrogenation, and others may be carried on together with the dehydrogenation and cracking process described above.

As stated above, the present invention is not restricted to the number of separate contacting columns and the number of separate conveyance zones connected and operated in series according to the principles described. In Figure 1 a system having four columns and four conveyance zones in alternate series is generally illustrated, and in Figure 2 the above described principles are applied to a specific application in which synthetic bead cracking catalyst is recirculated through two cracking columns and two conveyance zones in alternate series. Obviously any number greater than one may be operated according to the principles of this invention and the only restriction is that they be operated at successively lower levels in pressure by an amount at least equal to the minimum necessary over-all pressure differential required to convey the solids as a dense mass through the conveyance zones herein described.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a solids fluid contacting process wherein a solid contact material is recirculated through a plurality of contacting columns operated at substantially different pressures, a fluid is passed therethrough in contact with said contact material, and the solids are conveyed from one contacting zone to the next through a conveyance zone, the improvement which comprises maintaining the inlet of each conveyance zone submerged with solids to be conveyed therethrough from one contacting column to the next lower pressure column, passing a conveyance fluid through each conveyance zone at a rate sufficient to (1) overcome forces of gravity and friction acting on said solids and (2) to generate therein the desired pressure differential existing between successive contacting columns, passing solids from the outlet of each conveyance zone into the next lower pressure contacting column in solids receiving relation therewith while applying a solids restrictive force against solids discharging from each of said outlets to maintain the solids in said conveyance zones as a dense mass having substantially the solids static bulk density, passing solids from the lowest pressure column only into a solids pressuring zone, raising the pressure of fluid associated with said solids by an amount substantially equal to the total of the pressure differentials of all the contacting columns, then passing the thus pressured solids through a conveyance zone to the highest pressure contacting column to complete the solids cycle, disengaging said conveyance fluid from said solids adjacent the solids inlet of all but the lowest pressure column, passing at least part thereof through a bypass zone into engagement with said solids adjacent the solids outlet of the same column to convey said solids therefrom and to complete a closed cyclic fluid path through alternate conveyance and bypass zones, whereby said solids are maintained in continuous circulation by means of a single pressuring step, and said contacting columns need not be sealed from their respective conveyance fluid-disengaging zones.

2. A process according to claim 1 in combination with the step of repressuring conveyance fluid disengaged from solids adjacent the solids inlet to said lowest pressure contacting column by an amount substantially equal to the total of pressure differentials between all the contacting columns, and introducing said fluid into engagement with said pressured solid as conveyance fluid therefor to complete the conveyance fluid cycle.

3. A method according to claim 2 in combination with the step of separating a minor portion from the conveyance fluid disengaged from solids adjacent the solids inlet to all but the lowest pressure column, and repressuring these portions to provide additional conveyance fluid for said pressured solids.

4. A method according to claim 1 in combination with the step of varying the pressure of said conveyance fluid while by passing it around each of said solids contacting columns by an amount substantially equal to the difference in pressure between the solids inlet and outlet points of the respective contacting column.

5. A method according to claim 1 in combination with the step of preventing the generation of excessive pressure gradient in each of said conveyance zones by bleeding a portion of said conveyance fluid from the conveyance fluid stream bypassing the solids contacting columns and introducing the remainder as conveyance fluid into the subsequent conveyance zone.

6. A method according to claim 1 in combination with the step of passing said solids downwardly as a dense moving bed through each of said solids contacting columns from the solids inlet to the solids outlet thereof so that said solids exists as a single elongated dense moving mass extending without interruption from said solid pressuring zone through the alternate conveyance zones and contacting columns to the solids outlet of said lowest pressure column.

7. A method according to claim 6 in combination with the step of controlling the rate of solids recirculation by varying the rate at which said solids are pressured and conveyed from said solids pressuring zone to said highest pressure contacting column.

8. A method for recirculating granular solid contact material by means of a single stream of conveyance fluid through a plurality of contact zones maintained at successively and substantially lower pressures which comprises establishing a plurality of solids-fluid contacting zones, establishing an elongated conveyance zone communicating the solids outlet of each contacting zone with the solids inlet of the next lower pressure contacting zone, establishing a solids pressuring zone communicating in solids receiving relation with the solids outlet from only the lowest pressure contact zone and in solids delivery relation through another elongated conveyance zone with the solids inlet of the highest pressure contacting zone to complete the closed cyclic solids path, passing a conveyance fluid from the outlet of said pressuring zone in an alternate succession of said conveyance zones and conveyance fluid bypass zones communicating the solids inlet with the solids outlet of all but the lowest pressure contacting zone, disengaging said conveyance fluid from said solids adjacent the solids inlet of said lowest pressure contacting zone, increasing the pressure of said fluid by an amount substantially equal to the total pressure differential for all of said contacting zones, returning the thus pressured fluid as said conveyance fluid into engagement with solids from said pressuring zone to complete the conveyance fluid cycle, maintaining the inlet of each conveyance zone submerged in solids from the contacting zone communicating therewith, restricting the discharge of solids from each of said conveyance zones so as to maintain said solids moving therein as a dense compact mass having substantially the solids static bulk density, and controlling the flow rate of said conveyance fluid through the dense solids in each of said conveyance zones to (1) overcome forces of gravity and friction acting on said solids and (2) to generate the desired pressure differential existing between the two successive contacting zones communicating therewith, whereby said solids are maintained in continuous circulation by means of a single pressuring step, and said contacting zones need not be sealed from their respective conveyance fluid-disengaging zones.

9. A method according to claim 8 in combination with the step of passing the solids downwardly by gravity through each of said contacting zones in the form of a compact moving bed extending from the solids inlet to the solids outlet thereof without interruption so that the solids in the system are in the form of a single continuous dense moving mass extending from the solids outlet from said pressuring zone through alternate conveyance and contacting zones of successively lower pressure to the solids outlet of the lowest pressure contacting zone.

10. A method according to claim 9 in combination with the step of controlling the rate of recirculation of said single dense moving mass through the serially connected conveyance and contacting zones by varying the rate at which said solids are removed from said lowest pressure contacting zone, and pressured therein by an amount substantially equal to the total pressure differential of said contacting zones.

11. A method for the recirculation of a stream of granular solid contact material in a closed cyclic path from a high pressure point successively through a first conveyance zone, a high pressure hydrocarbon conversion zone, a second conveyance zone, a low pressure solids regeneration zone, and a solids pressuring zone back to said high pressure point, which method comprises passing a stream of conveyance fluid from said high pressure point concurrently with said solids through said first conveyance zone, then passing said conveyance fluid stream from the solids inlet separate and apart from said solids in said conversion zone to the solids outlet thereof, then passing said conveyance fluid stream concurrently with said solids through said second conveyance zone, then disengaging the conveyance fluid from the conveyed solids, repressuring at least part of said fluid by an amount substantially equal to the total pressure differential of said conversion zone and said regeneration zone, returning said fluid to said high pressure point to complete the conveyance fluid cycle, maintaining the inlets of each of said conveyance zones submerged in solids to be conveyed, maintaining the conveyance fluid flow therethrough at a value sufficient to overcome forces of gravity and friction acting on said solids and in said second conveyance zone at a value sufficient to generate the desired pressure differential existing between said conversion and regeneration zones, restricting the discharging stream of solids at the outlet of each of said conveyance zones to maintain the solids moving therein as a dense compact mass having substantially the solid's static bulk density, passing said solids downwardly through said conversion and regeneration zones as compact moving beds, increasing the pressure of fluids associated with said solids in said pressuring zone by an amount substantially equal to the total pressure differential between said conversion zone and said regeneration zone, and returning said solids to said high pressure point to complete the solids cycle, passing a hydrocarbon to be converted into said conversion zone maintained at conversion conditions, removing an effluent therefrom, and passing a regeneration fluid through said regeneration zone to produce regenerated solid contact material.

References Cited in the file of this patent

UNITED STATES PATENTS

| | | |
|---|---|---|
| 2,290,580 | Degnen | July 21, 1942 |
| 2,464,489 | Crowley | Mar. 15, 1949 |
| 2,583,352 | Berg | Jan. 22, 1952 |
| 2,642,381 | Dickinson | June 16, 1953 |
| 2,684,870 | Berg | July 27, 1954 |
| 2,684,872 | Berg | July 27, 1954 |
| 2,684,928 | Berg | July 27, 1954 |
| 2,684,929 | Schutte | July 27, 1954 |
| 2,684,930 | Berg | July 27, 1954 |
| 2,705,216 | Drew | Mar. 29, 1955 |
| 2,710,826 | Weikart | June 14, 1955 |
| 2,791,544 | Eastwood | May 7, 1957 |